United States Patent [19]

Littau

[11] Patent Number: 4,702,065

[45] Date of Patent: Oct. 27, 1987

[54] BELTED CROP-COLLECTING AND CONVEYOR SYSTEM

[76] Inventor: Eugene G. Littau, c/o Littau Harvester, 8974 Shaw Square Rd., SE., Aumsville, Oreg. 97325

[21] Appl. No.: 856,057

[22] Filed: Apr. 25, 1986

[51] Int. Cl.⁴ .............................................. A01D 46/22
[52] U.S. Cl. ................................. 56/329; 56/328 R; 198/821; 198/819
[58] Field of Search ..................... 56/328 R, 329, 330, 56/331, 327 R, 181-184; 198/821, 819

[56] References Cited

U.S. PATENT DOCUMENTS

| 3,553,949 | 1/1971 | Rauth | 56/329 |
| 3,601,965 | 8/1971 | Kaessbohrer | 56/330 |
| 4,130,982 | 12/1978 | Clary | 56/330 |
| 4,204,389 | 5/1980 | Delfosse | 56/329 |
| 4,259,833 | 4/1981 | Mohn et al. | 56/329 |

FOREIGN PATENT DOCUMENTS

| 2424695 | 11/1979 | France | 56/329 |
| 2023391 | 1/1980 | United Kingdom | 56/330 |
| 888851 | 12/1981 | U.S.S.R. | 56/329 |
| 1071262 | 2/1984 | U.S.S.R. | 56/329 |
| 1172478 | 8/1985 | U.S.S.R. | 56/329 |

Primary Examiner—Gene Mancene
Assistant Examiner—John Weiss
Attorney, Agent, or Firm—Kolisch, Hartwell & Dickinson

[57] ABSTRACT

The collector apparatus of the instant invention is intended for use on a harvester vehicle for collecting a crop harvested from plants arranged in rows. The apparatus includes a pair of elongate continuous conveyor belts formed of pliable are resilient material, each conveyor belt having elongate inner and outer runs, the inner runs being disposed adjacent and opposite each other. The conveyor belts have faces delineated between the lateral margins of the belt that face upwardly. An elongate conveyor frame is associated with each belt for supporting the conveyor belt and includes training means for training the conveyor belts thereabout. Means ar provided for driving the conveyor belts in counter rotating paths. Attachment means are provided for attaching the conveyor frames to the vehicle.

22 Claims, 6 Drawing Figures

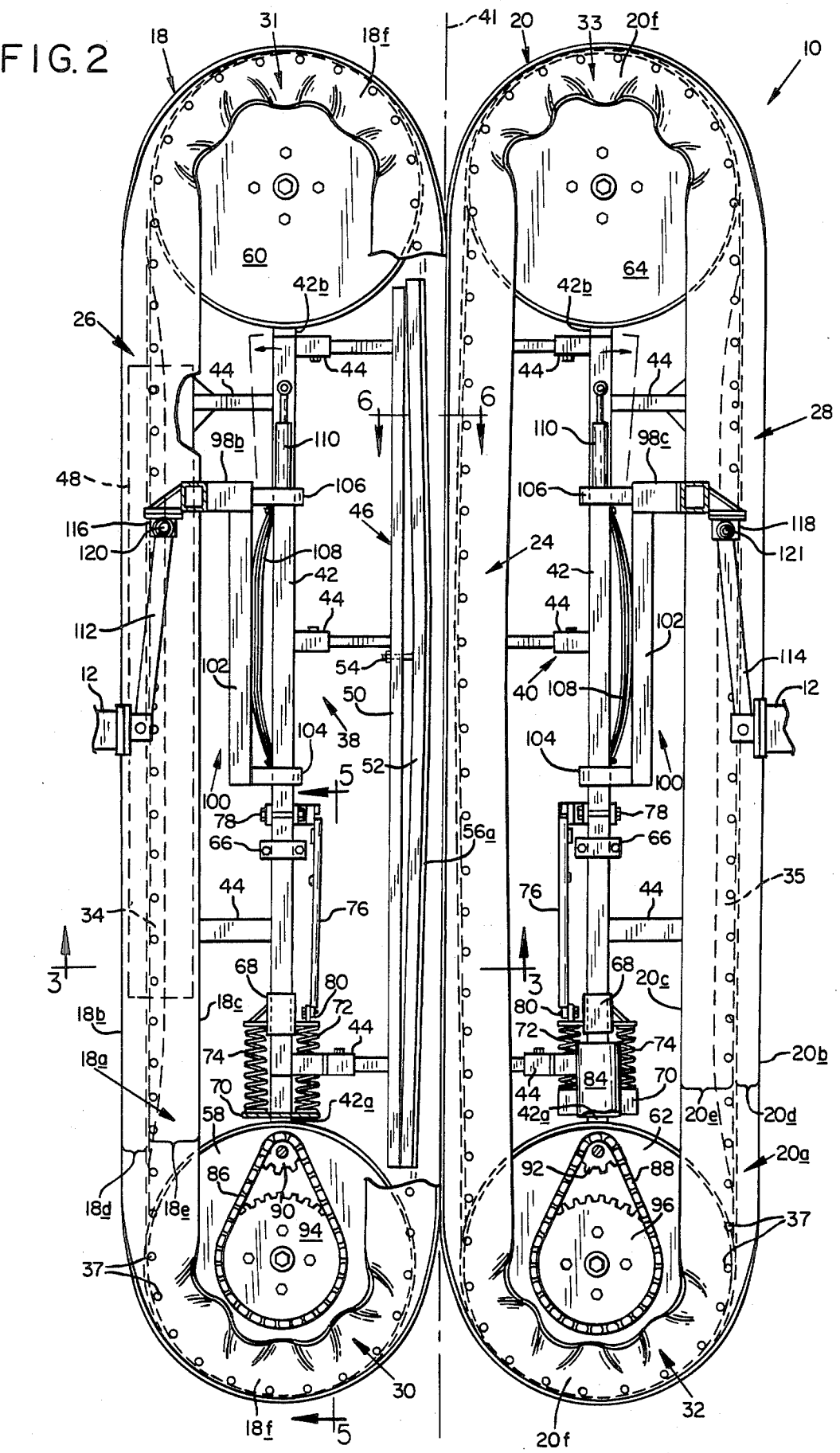

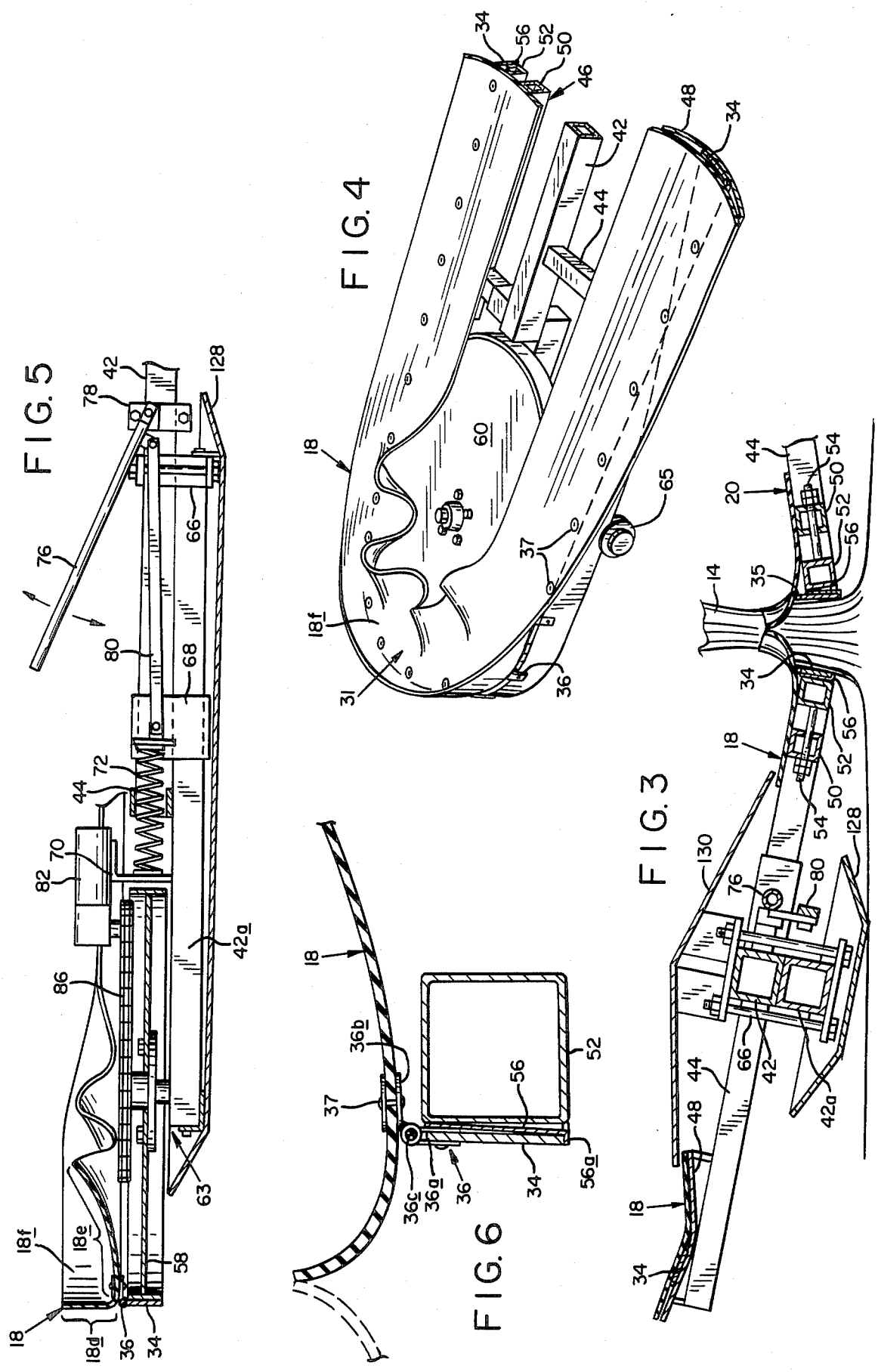

4,702,065

BELTED CROP-COLLECTING AND CONVEYOR SYSTEM

BACKGROUND AND SUMMARY OF THE INVENTION

The instant invention relates to crop-harvesting apparatus, and specifically to a collector apparatus which is constructed to collect the maximum amount of harvested crop with minimal damage to the crop-bearing plants.

Harvesters that are used for harvesting crops which grow on bushy plants arranged in rows, such as raspberries, blueberries, grape, jojoba, etc., generally utilize spring-biased pivotal platforms which form a more or less solid surface under the crop-bearing plants and which catch the fruit as the fruit is shaken off the plants. The small platforms open and close around the plants as the machine advances along a row. The problem with this type of arrangement is that the open area formed as the platforms swing around a plant allows a significant portion of the harvest to drop on to the ground rather than onto the harvester.

Additionally, spring-biased platforms can cause damage to the crop-bearing plants because they tend to abrade the plants where the platforms rub on the plants, breaking the bark of the plant and potentially allowing the plants to become infected. Another drawback with spring-biased platforms is the requirement that the platforms slope downward away from the plants so that the harvested crop will fall, under the influence of gravity, to a conveyor which moves the crops to a boxing station. Finally, the spring-biased platforms generally restrict the harvester vehicle to one way travel, as the biasing mechanism will not permit the harvester to back once it has entered a row and the platforms have engaged the plants therein.

An object of the instant invention is to provide a collector apparatus which will collect a maximum amount of harvested crop.

Another object of the instant invention is to provide a collecting apparatus which has a continuous, pliable and resilient conveyor belt which is deformable into a harvest-containing pocket.

A further object of the instant invention is to provide a collector apparatus which in an noninjurious manner compresses the base of crop-bearing plants as the collector apparatus moves along a plant row.

Yet another object of the instant invention is to provide a collector apparatus which is virtually nonabrasive to crop-yielding plants.

Still another object of the instant invention is to provide a collector apparatus which has means for training a conveyor belt about a racetrack-like run with a harvested crop retained on the conveyor belt.

A further object of the instant invention is to provide a collector apparatus which includes means for driving a conveyor belt at an essentially zero velocity relative to crop bearing plants.

Another object of the instant invention is to provide a collector apparatus which operates close to ground level.

A further object of the instant invention is to provide a collector apparatus which includes means for flexibly and resiliently attaching a conveyor belt frame to a harvester vehicle.

The collector apparatus of the instant invention is intended for use on a harvester vehicle for collecting a crop harvested from plants arranged in rows. The apparatus includes a pair of elongate, continuous conveyor belts formed of pliable and resilient material, each conveyor belt having elongate inner and outer runs, the inner runs being disposed adjacent and opposite each other. The conveyor belts have an upwardly facing surface delineated between the lateral margins of the belt. An elongate conveyor frame is associated with each belt for supporting the conveyor belt and includes training means for training the conveyor belts thereabout. Means are provided for driving the conveyor belts in counter rotating paths. Attachment means are provided for attaching the conveyor frames to the vehicle.

These and other objects and advantages of the instant invention will become more fully apparent as the description which follows is read in conjunction with the drawings.

DESCRIPTION OF THE DRAWINGS

FIG. 2 is a top plan view of a pair of conveyor frames having conveyor belts disposed thereon, with portions broken away to show detail.

FIG. 3 is a cross-sectional view taken generally along the line 3—3 of FIG. 2.

FIG. 4 is a perspective view of an end of a conveyor frame, showing a harvest-containing pocket formed in the conveyor belt.

FIG. 5 is a side sectional view of an extensible end of the conveyor frame, taken generally along the line 5—5 of FIG. 2.

FIG. 6 is an enlarged sectional view of an arcuate member of the conveyor frame, taken generally along the line 6—6 of FIG. 2.

DETAILED DESCRIPTION OF A PREFERRED EMBODIMENT

Figure 1:
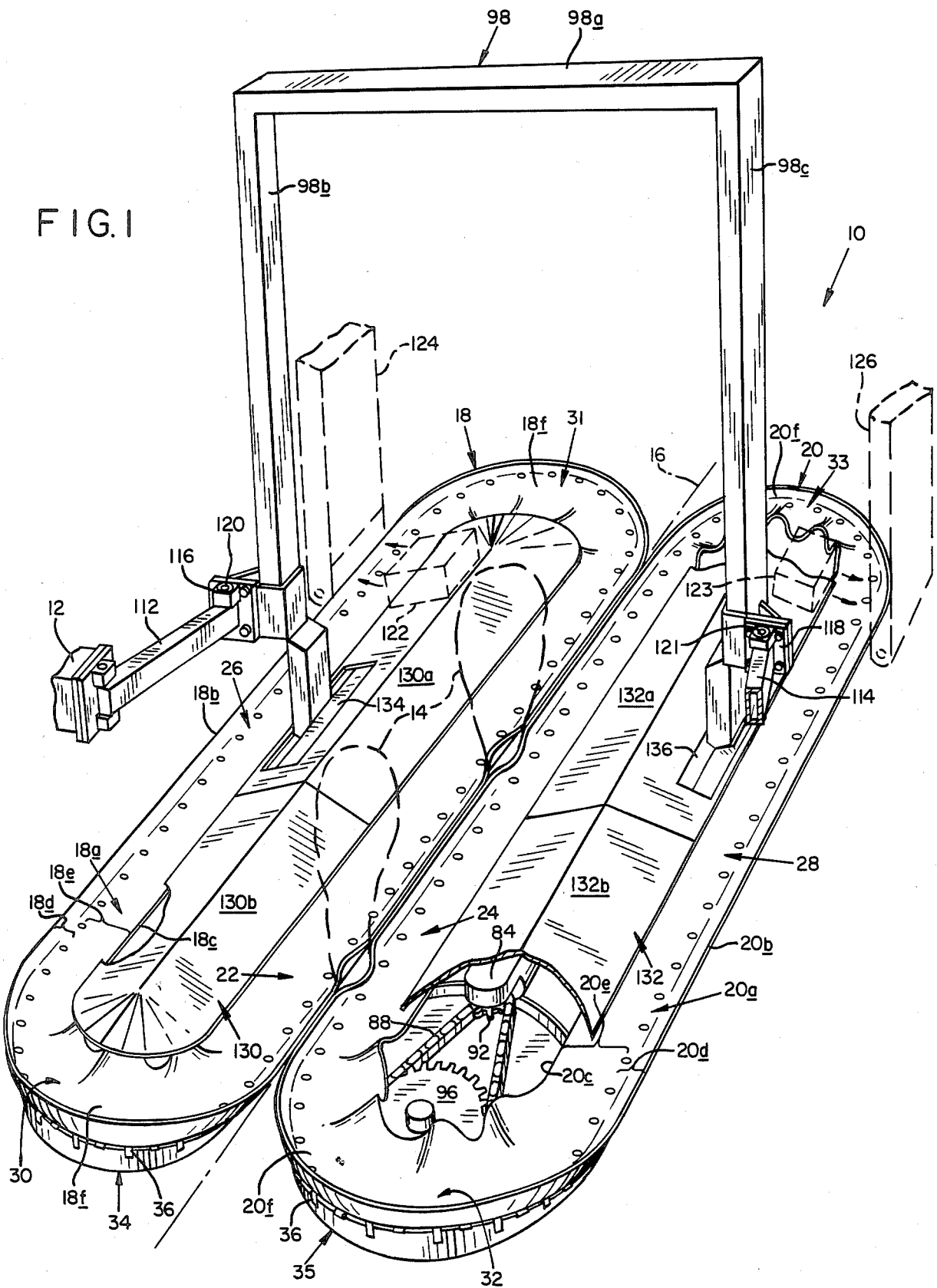
FIG. 1 is a rear perspective view of a collector apparatus constructed according to the invention, with portions broken away to show detail.

Turning now initially to FIGS. 1 and 2, a collector apparatus is shown generally at 10. Apparatus 10 is intended for use on a harvester vehicle, shown in phantom lines at 12. Such a vehicle is described in my copending application Ser. No. 780,843, filed Sept. 27, 1985, entitled "CROP WORKING VEHICLE". The apparatus is also suitable for use with any conventional type of powered agricultural vehicle so long as a suitable mounting is provided Crop-separating means are usually provided on the vehicle and may include conventional beater bars to remove a ripened crop from a plant.

Apparatus 10 is intended for collecting a crop, such as berries, from plants, such as those indicated at 14 (FIG. 1) which are arranged in a row, as represented by line 16.

Apparatus 10 includes a pair of elongate, continuous harvest collecting conveyor belts 18 and 20. The belts are formed of a pliable, resilient material and are arranged in a generally horizontal orientation. By this it is meant that each belt has an upper face or surface, 18a, 20a which faces upwardly and extends between the lateral margins 18b, 20b and 18c, 20c, respectively, of the belts.

Belts 18 and 20 are arranged in racetrack-like runs. As depicted, the belts have corresponding inner or facing runs 22, 24, which are placed adjacent and opposite each other, and outer runs 26, 28, which are disposed laterally outwardly of the inner runs. Each belt has opposed curved expanses, such as expanses 30, 31 for belt 18 and expanses 32, 33 for belt 20. The curved expanses extend between and join the extremities of the inner and outer runs to form a continuous structure.

Drive belts 34, 35 are coextensive with conveyor belts 18, 20, respectively. The drive belts are located on the underside of the conveyor belt and are secured such that the face of the drive belt is substantially normal to the upper face of the conveyor belt. A conveyor belt and its associated drive belt are referred to herein collectively as conveyor means.

Each drive belt, in the preferred embodiment, is flexibly attached to its respective conveyor belt by hinges, such as hinge 36 which include, referring now to FIG. 6, a plate 36a attached to the drive belt, a plate 36b attached to the conveyor belt, and a pin 36c attaching plates 36a and 36b to each other. The plates are secured to their respective belts by fasteners 37.

The drive belts divide the conveyor belts into an outboard portion, such as portion 18d, and an inboard portion, such as portion 18e. As each conveyor belt traverses its curved end runs, the outboard portion of the conveyor belt turns up in a circular curve while the inboard portion deforms and turns up in a ripple-like form. Thus a harvest-containing, or ripple, pocket, such as 18f, 20f, is formed in each of the curved expanses to retain the harvested crop as the conveyor belt traverses its end runs.

The ripple pocket formed in the opposed curved expanses of the conveyor belt enable a substantially flat surface, i.e., the upwardly exposed face of the conveyor, to bend about a 180° turn while still retaining a harvested crop thereon.

An important feature of the invention is the arrangement of inner runs 22 and 24 such that negative clearance is provided between the outboard portions 18d, 20d of belts 18 and 20, respectively. Negative clearance causes the belts to abut and deform along the inner run and allows the belts to contact the bushes in the row without abrading the bark on the bushes.

Referring now to FIG. 2, a pair of conveyor frames 38, 40, associated with conveyor belts 18, 20, respectively, are depicted and provide means for mounting the conveyor belts and drive belts. Frames 38 and 40 are substantially mirror images of one another although it is not necessary that every element of one frame be precisely mirrored on the opposing frame. The frames are arranged such that the conveyor belts carried thereon meet at an apparatus center line 41.

With reference now to FIG. 2, each frame includes a central longitudinal support 42. Conveyor support means extend along either side of frame 38 and are secured to longitudinal support 42 by arms 44.

Conveyor support means includes an inner or inboard support, shown generally at 46 and an outboard support 48. Inner support 46 constitutes an elongate conveyor belt run support extending under the inner run of the conveyor belt and supporting the run above the ground, and outboard support 48 constitutes an elongate conveyor belt run support extending under the outer run of the conveyor belt and supporting the outer run of above the ground. Referring momentarily to FIG. 3, outboard support 48 may be seen to include, in the preferred embodiment, a slightly concave plate which extends along a majority of the length of the outer run of the conveyor belt and which is supported by arms 44. In the preferred embodiment, the drive belt folds against the lower surface of the conveyor belt while traversing support 48.

Referring now to FIGS. 2, 3 and 6, inner support 46 includes a stringer 50, which is secured to arms 44, and a cambered or arcuate member 52. Member 52 is formed to provide outward deflection of drive belt 34, 35 and is directed towards the opposing frame. In the preferred embodiment, member 52 is formed of two-inch square tubing and provides a spring-like action on the drive belt entrained thereover. Member 52 is flexibly secured at either end of stringer 50 and is outwardly adjustable by means of nut and bolt combination 54, located intermediate the ends of member 52.

A drive belt guide 56 is secured to the outer surface of member 52 and includes a drive belt supporting lip 56a which the drive belt rides on when such is moving along the inner run.

Referring now to FIGS. 2 and 5, a pair of rotatable pulleys or wheels are located on each frame. The pulleys, such as pulleys 58, 60 on frame 38 and 62, 64 on frame 40 are located at either end of the longitudinal supports and are rotatably mounted on the supports by conventional means, shown generally at 63 in FIG. 5. The upper surface of each pulley defines a plane which supports the underside of the conveyor belt associated therewith. The drive belts engage the edges of the pulleys. The pulleys and conveyor support means comprise what is referred to herein as training means, which is located on the frame for training the drive and conveyor belts thereabout. A drive belt roller 65 (FIG. 4) is operable in the preferred embodiment to ensure alignment between drive belts 34, 35 and pulleys 60, 64, respectively The ends of longitudinal support 42 are relatively extensible. Specifically, the rear end of longitudinal support 42 includes a sliding portion 42a which is slidably secured to longitudinal support 42 by brackets 66 and 68. Bracket 66 is secured to support 42 while bracket 68 is slidable thereon. A plate 70 is secured to portion 42a and is operative with springs 72, 74 for producing extension of the frame and tensioning of the belts thereon. A lever 76 is pivotally mounted on a bracket 78 which is secured to longitudinal support 42. An arm 80 extends between lever 76 and bracket 68 and allows tensioning of springs 72, 74 which act on plate 70, thereby biasing portion 42a and causing extension thereof. Pulley 58 is carried on portion 42a and moves therewith.

Referring now to FIG. 4, a portion 42b of longitudinal support 42 is secured below portion 42 and carries pulley 60. Similar construction is used in frame 40.

Driving means are provided for driving the conveyor belts in counter rotating paths. In the preferred embodiment, driving means includes a hydraulic motor 82, 84 associated with each frame. Drive chains 86, 88, connect sprockets 90, 92 on the motors with sprockets 94, 96 on pulleys 58, 62, respectively. Speed control means, which, in the preferred embodiment, comprise an escape valve (not shown) associated with the hydraulic motors allow the motors to drive their respective pulleys and thus the conveyors associated therewith, at a zero velocity relative to the plants which the apparatus is moving over. Hydraulic fluid under pressure is supplied to motors 82, 84 and causes a motive force sufficient to drive the conveyor means at a linear speed slightly greater than that of the vehicle during a harvesting operation. As the conveyor means contacts crop-bearing plants, it is frictionally slowed by the plants. The pressure relief valve is set to allow a motive force to be imparted to the conveyor means which is sufficient to overcome internal friction in the apparatus without producing movement of the conveyor means which is greater than the linear speed of the harvester, thereby significantly reducing the amount of abrasion to the plants caused by the apparatus.

Attachment means are provided for attaching the conveyor frames to the vehicle. In the preferred embodiment, attachment means take the form of a substantially inverted U-shaped support 98 which supports frames 38, 40 in a spaced apart relationship for straddling a row of plants.

Referring now to FIGS. 1 and 2, support 98 includes a transverse portion 98a and upright portions 98b and 98c. The lower extremities of portions 98b and 98c are flexibly secured to the conveyor frame by means of a flexible mounting assembly shown generally at 100. Assembly 100 includes a longitudinal element 102 which is secured to, for example, portion 98b. Element 102 has mounted at either end thereof brackets 104, 106 which allow fore and aft as well as side-to-side movement of longitudinal support 42 therein. A leaf spring 108 is secured to support 42 and acts on element 102 to bias support 42 to a normal, aligned position. A cylinder 110 is provided to maintain fore and aft positioning of support 42 relative to the attachment means. Cylinder 110 may be a conventional shock absorber, or it may be a hydraulic cylinder and accumulator combination which would allow adjustment of frame 38 relative to the attachment in a fore and aft relationship in addition to providing shock absorbing capabilities.

The attachment means is constructed to cause a negative clearance between the outboard portions of the conveyor belts as they extend along their inner runs. This causes the curling up of the conveyor belts, as depicted in FIG. 3, and provides that virtually all of the crop harvested from the plants will land on the conveyor belts.

Frames 38, 40 are secured to support 98 such that drive belts 34, 35, when extending along the cambered or arcuate surface of member 52 cooperate to compress the base of the plants in row 16, without abrading the outer layer of the plant stem. Compressing the base of the plant with the drive belt allows the conveyor belt to substantially fully enclose the plant thereby assuring the recovery of the greatest amount of harvested crop.

Support 98 is attached to the harvester vehicle by means of connecting arms 112, 114. One end of arms 112, 114 is secured to the harvester vehicle and the other end of each arm is secured to mounting brackets 116, 118 on support 98. Support arms 112 and 114 have pins 120, 121 fixed at the ends thereof, which cooperate with bores in mounting brackets 116, 118, respectively, to fix support 98 to the harvester vehicle and allow easy and fast connection and disconnection of apparatus 10 to vehicle 12.

Referring now to FIG. 3, frames 38, 40 are mounted on support 98 such that the frames are tilted about their longitudinal axes toward center line 41 of the apparatus, as represented by the inner runs of the conveyor belts. This provides that the inner run of the conveyor will be as close to the ground as possible, also assisting in the capture of a maximum amount of the harvest and eliminating the need for the traditional pivotal platforms and gravity-fed conveyor.

Crop removal means are provided to remove the harvested crop from the conveyor belts. In the preferred embodiment, the crop removal means may take the form of blower-type devices 122, 123 which act to remove the harvested crop from the conveyor belts by means of an air stream. A second conveyor 124, 126 is provided to transport the crop once removed from the conveyor belts to a boxing station on the harvester vehicle where the crop is placed in containers for transport away from the harvest site.

Alternately, plant removal means may include some form of scraper which would brush the harvested crop from the conveyor belt onto the second conveyor or directly into containers.

Referring now to FIGS. 3 and 5, a skid 128 is provided beneath each end of the conveyor frame to protect the working mechanisms of the pulley wheels and associated structure.

Frame covers 130, 132 are provided to cover the upper portion of the working mechanism and to direct the harvested crop onto the conveyor belts. The covers include forward sections 130a, 132a and rear sections, 130b, 132b. The rear sections may be easily removed to allow access to the hydraulic motors when necessary. Covers 130, 132 extend between and over a portion of the inner and outer runs of the conveyor belt and also cover a portion of the curved expanses at the ends of the run. This ensures that all of the crop which is removed from the plants will land on the conveyor belts. A flexible boot 134, 136 is located in cover 130, 132 to allow passage of portions 98b, 98c, respectively, therethrough.

Operation

As a harvester, with the apparatus of the invention carried thereon, approaches a row of plants to be harvested, the driver aligns center line 41 of the apparatus with row 16. As the vehicle begins down the row, crop-separating means, which may be conventional beater bars arranged on the harvester vehicle, are activated and shake the plants, causing the ripened crop to fall from the plants. The crop will fall onto the inner runs of the conveyor belts as well as covers 130, 132. Gravity and the vibration of the apparatus will cause any of the harvested crop landing on the covers to ultimately fall onto the conveyor belts. The action of the drive belts and arcuate members 52 act to compress the base of the plants while the pliable, resilient material forming the conveyor belts acts to virtually completely enclose the base of the plant resulting in a near 100% capture of the harvested crop.

The conveyor belts are driven by motors 82, 84 with the speed control means acting to prevent movement of the conveyor means at a speed greater than that of the vehicle, thus providing a zero relative velocity between the inner runs of the conveyor belts and the plant in a row.

The crop will be retained on the conveyor belts until it comes opposite the crop removing means, such as blower devices 122, 123, where it is removed from the conveyor belt.

Flexible assembly 100 provides that frame 38, 40 may deflect side-to-side should the harvester vehicle not remain perfectly aligned with the row. This also prevents abrasion to the plants. Likewise, should an obstruction be encountered, shock 110 allows limited fore and aft movement of frames 38 and 40.

Over a period of time it could be expected that the drive and conveyor belts would stretch to some degree.

This would be compensated for by the presence of the extensible mechanism which would serve to keep the belts taunt. Should it be necessary to replace a conveyor/drive belt, cover sections 130b, 132b may be easily removed allowing lever 76 to be moved to an upright position, releasing tension on spring 72, 74 and allowing removal of the drive and conveyor belts from the frame, to be followed by replacement with a new conveyor/drive belt.

Thus a collector apparatus has been described which is designed to collect a maximum amount of a harvested crop. The apparatus includes a pair of continuous, pliable and resilient conveyor belts which face upwardly throughout a racetrack-like run and which initially receive and retain a harvested crop thereon until the crop carried on the conveyor belt passes a crop removal station. A drive belt connected to the conveyor belt acts to compress the base of the plants as the apparatus moves along a plant row and does so in a virtually nonabrasive manner, thereby protecting the plants.

Although a preferred embodiment of the invention has been described, it should be appreciated that variations and modifications may be made thereto without departing from the spirit of the invention.

It is claimed and desired to secure by Letters Patent:

1. A collector apparatus for use on a harvester vehicle for collecting a crop harvested from plants arranged in rows comprising:
a pair of elongate continuous conveyor belts formed of pliable and resilient material, each conveyor belt having an elongate inner run, said inner runs being disposed adjacent and opposite each other, and each conveyor belt having an elongate outer run, said outer runs being disposed laterally outwardly of the inner runs, the conveyor belts having faces delineated between the lateral margins of the belts that face upwardly;
an elongate conveyor frame associated with each belt for supporting the conveyor belt, training means mounted on each conveyor frame training thereabout the conveyor belt associated with the conveyor frame, each conveyor frame further including an elongate conveyor belt run support extending under the inner run of the conveyor belt associated with the conveyor frame and supporting the inner run above the ground;
means for driving said conveyor belts in counter rotating paths; and
attachment means for attaching said conveyor frames to the vehicle.

2. The collector apparatus of claim 1 wherein the belts have a construction whereby they are free to deform to have transverse concavity imparted to their said upper faces and wherein said inner runs are disposed with negative clearance therebetween so that the conveyor belts abut and deform to have said transverse concavity along their inner runs.

3. The collector apparatus of claim 1 wherein each of said conveyor frames includes a central longitudinal support, the training means of a conveyor frame comprising rotatable pulleys at either end of the longitudinal support of the conveyor frame, and the belt run support of a conveyor is mounted on the central longitudinal support of the conveyor frame and has a a cambered surface directed toward the opposing conveyor frame.

4. The collector apparatus of claim 1 wherein said training means comprises a pair of spaced pulley wheels supporting opposite expanses of the belt, the elongate conveyor frame is extensible and has relatively extensible ends, said pulley wheels being mounted on respective ends of said extensible frame, and which further comprises biasing means for producing extension of the frame and tensioning of the belt, and wherein said attachment includes yieldable means yieldably and resilient holding said conveyor frames in a predetermined position relative to the vehicle.

5. The collector appartus of claim 1 wherein the conveyor belts have a construction whereby they are free to deform to have transverse concavity imparted to their said upper faces, and which further comprises an elongate continuous drive belt for each conveyor belt, the drive belt extending the length of the conveyor belt on the underside of the conveyor belt and being secured to the conveyor belt, the face of the drive belt extending substantially normal to the upper face of the conveyor belt.

6. The collector apparatus of 5 wherein the means for training a conveyor belt comprises a pair of spaced pulleys which train the drive belt secured to the underside of the conveyor belt.

7. The collector apparatus of claim 5 which further comprises chambered means for each conveyor belt engaging the drive belt which is secured to the conveyor belt in a run which is coextensive with the inner run of the conveyor belt to produce arcuate outward deflection of the drive belt.

8. The collector apparatus of claim 1 which further includes crop removal means operable to remove a harvested crop from the outer runs of said conveyor belts.

9. Collector apparatus for use on a harvest vehicle comprising:
a pair of continuous, laterally spaced, pliable and resilient harvest-collecting conveyor belts, said conveyor belts having continuous racetrack-like runs which include for each belt an inner run which is opposed an adjacent the corresponding inner run of the other belt, the belts having upper belt faces delineated between lateral margins thereof that face upwardly and lower belt faces delineated between lateral margins thereof that face downwardly, the belt having a construction whereby they are free to deform to have upwardly facing transverse concavity imparted thereto throughout the extend of the belt lying between the belts upper and lower faces,
a continuous drive belt for each conveyor belt coextensive with the conveyor belt secured throughout its length to the lower face of the conveyor belt and with the face of a drive belt exposed generally normal to the upper face of the conveyor belt; and
mounting means for each conveyor belt which includes an elongate frame and a pair of spaced pulleys mounted on said frame, said pulleys training the drive belt which is secured to the conveyor belt.

10. The collector apparatus of claim 9 wherein each of said frames includes conveyor support means extending longitudinally along either side of a frame, including an inner support having an generally arcuate form and a drive belt support lip at the base thereof.

11. The collector apparatus of 10 wherein said mounting means further includes attachment means attached to the elongate frame for the respective conveyor belts for attaching the apparatus to a vehicle.

12. The collector apparatus of claim 11 wherein said attachment means is constructed and arranged to support said conveyor frames in a spaced apart relationship for straddling a row with the drive belt moving over the arcuate surface acting on the plants to compress the plants to a predetermined width.

13. The collector apparatus of 11 wherein the inner runs of the pair of conveyor belts are disposed with negative clearance therebetween so that such abut and deform.

14. The collector apparatus of claim 13 wherein said conveyor belt is constructed and arranged to form a harvest-containing pocket as said conveyor belt traverses the ends of said run.

15. A collector apparatus for collecting a crop harvested from plants arranged in a row comprising;
   an elongate conveyor belt of pliant and resilient material extending generally in a horizontal direction, the belt having an upper face delineated between lateral margins of the belt that faces upwardly, the belt having elongate opposed runs and opposed curved expanses extending between and joining extremities of said runs;
   an elongate drive belt coextensive with the conveyor belt and joined to the underside thereof in a region intermediate the lateral margins of the conveyor belt; and
   means mounting the conveyor belt comprising an elongate frame and a pair of pulleys mounted on said frame operatively training said curved expanses of the conveyor belt, said pulleys being located on the underside of the conveyor belt and the belt being trained with the production of ripple pockets and said curved expanses and by reason of the drive belt extending about and engaging said pulleys.

16. The apparatus of claim 15 wherein said frame is extensible and has relatively extensible ends and wherein said pulleys are mounted on respective ends of said frame and which further include biasing means for extending said frame.

17. The apparatus of claim 15 which further includes another conveyor belt and mounting means for the conveyor belt having the construction claimed in claim 15 and mounted with a run thereof disposed adjacent and opposed to a corresponding run in the first-mentioned conveyor belt.

18. The apparatus of claim 17 wherein said adjacent runs are disposed with negative clearance so that the runs abut and deform.

19. A collector system for collecting a crop harvested from plants arranged in rows, for use on a harvester vehicle having crop-separating means mounted thereon, comprising:
   a pair of spaced apart opposed conveyor frames having a rotatably mounted wheel at each end thereof, the upper suface of said wheel defining a plane;
   continuous conveyor means carried on each of said frames, said conveyor means being mounted for movement in a racetrack-like run about said frame, each run including inner, facing runs, outer runs and curved end runs, said conveyor means including a flexible crop-carrying conveyor belt having parallel margins along its length and a drive belt flexibly attached to the underside of said conveyor belt intermediate the margins of the conveyor belt, said conveyor belt having an outboard portion which is outboard of the drive belt and an inboard portion which in inboard of the drive belt, said conveyor belt having an upper face delineated between said parallel margins that faces upwardly, said conveyor belt extending between said wheels and forming a harvest retaining pocket as said belt traverses the curved end run by reason of the outboard portion of the conveyor belt turning up in a circular curve and the inboard portion of the conveyor belt turning up in ripple-like form;
   attachment means for supporting said frames a predetermined distance from one another and for attaching said framed to the vehicle, said predetermined distance being selected to provide negative clearance between said outboard portions of said convyor belts such that the conveyor belts abut and deform along said inner runs of the conveyor means; and
   means for driving each of said conveyor means at a zero velocity relative to the plants as the vehicle moves along a row.

20. The system of claim 19, wherein said conveyor frame includes a central longitudinal support, an outer support for supporting said outer run of the conveyor means and an inner support for supporting said inner run of the conveyor means, said inner support having an outwardly cambered surface.

21. The system of claim 20 wherein said conveyor frames are mounted on said attachment means with said drive belts along the inner runs of the conveyor means spaced apart a known distance to compress the plants to a predetermined width as the frames are moved along a row.

22. The system of claim 20 wherein said frames are resiliently mounted on said attachemt means to allow limited lateral movement of said frames relative to the plant rows.

* * * * *